Figure 1:
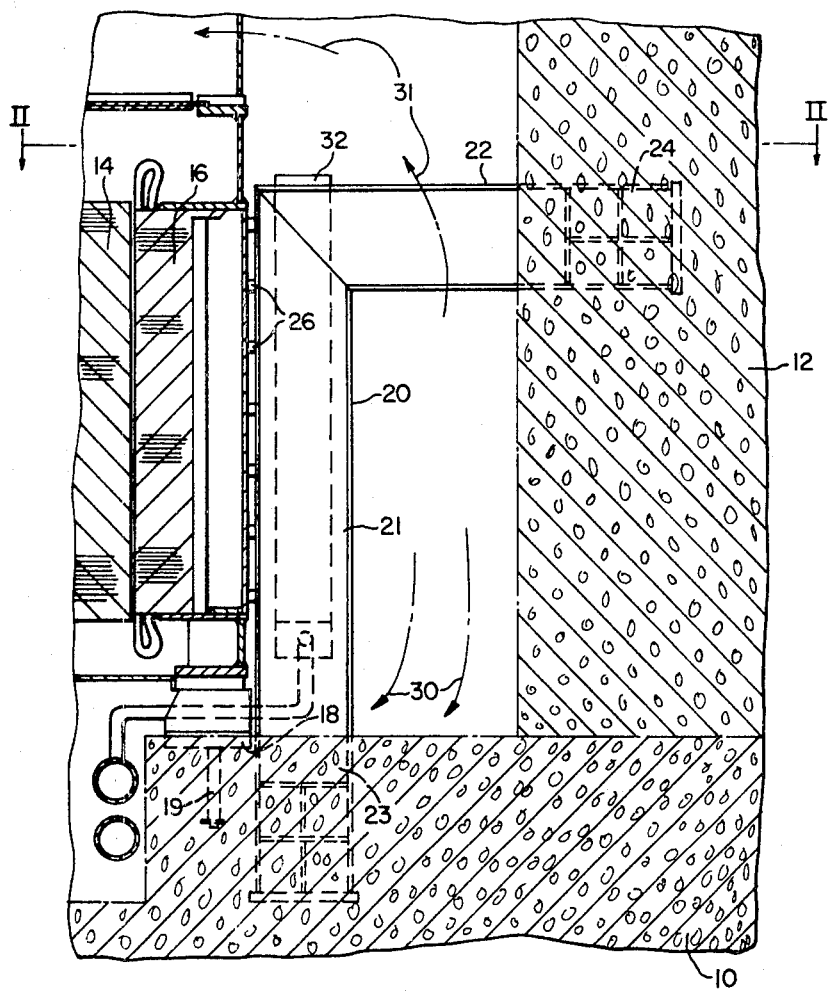

United States Patent [19]
Whitney

[11] 3,742,271
[45] June 26, 1973

[54] VERTICAL DYNAMOELECTRIC MACHINE WITH IMPROVED STATOR SUPPORT

[75] Inventor: Eugene C. Whitney, Pittsburgh, Pa.

[73] Assignee: Westinghouse Electric Corporation, Pittsburgh, Pa.

[22] Filed: Oct. 18, 1971

[21] Appl. No.: 189,884

[52] U.S. Cl. .................................. 310/157, 310/91
[51] Int. Cl. .............................................. H02k 5/00
[58] Field of Search ........................ 310/157, 69, 91, 310/57, 58, 258

[56] References Cited
UNITED STATES PATENTS

| | | | |
|---|---|---|---|
| 3,523,203 | 8/1970 | Whitney | 310/157 |
| 3,293,464 | 12/1966 | Spirk | 310/157 |
| 3,387,152 | 6/1968 | Mucke | 310/157 |
| 2,722,612 | 11/1955 | Danel | 310/157 |
| 2,320,843 | 6/1943 | Baudry | 310/258 |

Primary Examiner—R. Skudy
Attorney—A. T. Stratton, G. H. Telfer et al.

[57] ABSTRACT

In a vertical dynamoelectric machine, such as a water-wheel generator, primary support is here provided by a rigid foundation and upstanding wall concentric with the machine elements, where the foundation and wall are of a material such as concrete. To permit limited movement of the stator core caused by thermal expansion and contraction of the stator core and by magnetic pull, there are a plurality of rigid beams surrounding the core, each having a vertical portion with its lower end embedded in the foundation and a radial portion with its outer end embedded in the wall. The stator is joined to the vertical portion by means of both radial and tangential members that are flexible compared with the wall and the stator. In this way secure support is provided while permitting changes in position due to thermal effects and magnetic forces without causing damage as would occur in normal construction where such vertical dynamoelectric machines are made of large size.

2 Claims, 2 Drawing Figures

PATENTED JUN 26 1973 3,742,271

VERTICAL DYNAMOELECTRIC MACHINE WITH IMPROVED STATOR SUPPORT

BACKGROUND OF THE INVENTION

1. Field of the Invention

This invention relates to dynamoelectric machines and particularly to vertical dynamoelectric machines such as waterwheel generators.

2. Prior Art

With greater emphasis on increasing generator capacity, prior art types of vertical generators have been made in increasingly larger sizes. In some respects increasing machine size does not present additional problems. However, in other respects serious problems are encountered requiring solutions not relevant to more normal machine sizes. For safe machine operation with good electrical characteristics it is necessary to maintain a uniform close spacing between the rotor and stator of the machine. This air gap, usually from ½ to 1½ inches, is required even through the overall dimensions of the machine become large. Machines presently under construction for producing 600 megawatts of power have an overall diameter over 60 feet. In such machines, the air gap dimension represents a very small fraction of the overall machine size and its control is a serious problem.

The magnetic pull to which the stator is subjected in operation produces forces that tend to cause the stator to collapse radially and to take an elliptical form. Consequently the stator must be mounted within a support housing that prevents such collapse which would obviously destroy the air gap and make the machine inoperable. If the stator is secured to a rigid frame of sufficient stiffness to prevent such collapse there is then encountered the problem of dealing with normal thermal contraction and expansion. Rigidly securing the stator to a rigid frame would limit the expansion of the stator so severely that the stator laminations would buckle severely under normal thermal cycles. It was in seeking a solution to the foregoing problems that the present invention came about.

U.S. Pat. No. 3,387,152 to Mücke, June 4, 1968, is directed to similar problems. According to that patent a vertical machine is disposed within a concrete housing. The housing includes a wall that is concentric with the stator and which has numerous passages through it for the location of rod shaped struts spaced uniformly along the periphery of the stack. The outer ends of the struts are secured or anchored directly at the outer surface of the concrete housing wall. The struts are connected at their inner ends to the stator stack which places the concrete housing wall under compression and the struts and the stack under tension. The struts are preferably oriented in a non-radial manner so that they are tangential to a cylinder somewhat smaller than the stator stack itself. In this preferred form of that patent's invention both radial and tangential forces are transmitted to the foundation. Unfortunately, the proposed solution of the patent provides inadequate space for heat exchangers in the space between the stator and housing wall nor does it permit access to that space for normal inspection and maintenance.

SUMMARY OF THE INVENTION

In accordance with the present invention. a vertical dynamoelectric machine is located in a housing of material such as concrete that includes a rigid wall concentric with the stator and spaced therefrom. A plurality of rigid beams are disposed in the space between the stator and the wall. These beams have a vertical portion with the lower end secured to the foundation and a radial portion with an outer end secured to the wall. The stator is secured to the beams by means comprising both radial and tangential members joined therebetween that are flexible compared with the beam. Because of the rigidity of the beams, they need not be large in number. For example, in the 600 megawatt machine referred to above, 15 beams are employed. This permits considerable space to be available between the stator and the housing wall for purposes of providing heat exchangers for air cooling and also to permit access for inspection and maintenance.

THE DRAWING

Figure 2:
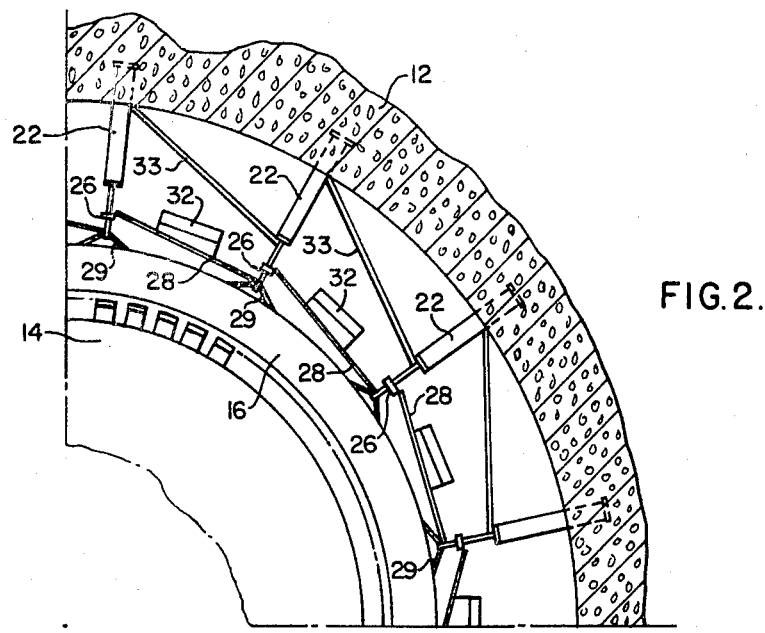

FIG. 1 is a partial elevational view, in section, of one embodiment of the present invention; and FIG. 2 is a partial plan view, in section, of the embodiment of FIG. 1 taken along line II—II with additional structural details illustrated.

PREFERRED EMBODIMENTS

Referring to the drawing, a dynamoelectric machine is shown that is of the vertical type as is normally used for waterwheel generators. The stator 16 of the machine is supported on a foundation 10. An upstanding housing or wall 12 is integral with the foundation 10 and both are of a rigid structural material such as concrete. Within the stator 16 is located a rotor 14 (a salient pole rotor in this embodiment) which is mounted on a vertical shaft (not shown). Full details of the machine are not illustrated except as to those features directly pertaining to this invention which primarily involves the relation of the stator 16 to the foundation 10 and wall 12. In other respects the machine may be formed in accordance with known design techniques for vertical dynamoelectric machines.

The stator 16 rests on a plurality of spaced sole plates 18 that permit movement of the stator in relation thereto as by being greased. The sole plates 18 are spaced around the foundation in a circular array and are secured to the foundation 10 such as by foundation bolts 19, in accordance with known practice.

An appreciable space occurs between the stator 16 and the wall 12. In this space are located a plurality of rigid beams 20 around the periphery of the stator 16. The beams 20 are preferably spaced equidistant from each other and are massive and strong enough to be rigid in their mounted position. The beams have a vertical portion 21 and a radial portion 22. The lower extremity 23 of the vertical portion is embedded in, or otherwise solidly affixed to, the foundation 10, and the outermost extremity 24 of the radial portion is embedded in, or otherwise solidly affixed to, the housing wall 12. Thus, the beams 20 are mounted to be as substantially inflexible and rigid as the housing. In an alternative form the beams may have some form of flexible mounting between each of them and the foundation 10 and wall 12; it is preferred however to use the form of the invention as shown in which the beams are solidly affixed to the foundation and wall as by embedding the extremities 23 and 24.

The stator 16 is joined to the vertical portion 21 of each beam by means that includes both radial and tangential members that are flexible compared with the beams and housing.

In the embodiment shown, the means joining the stator 16 and the vertical portion 21 of each beam comprises a plurality of radial members 26 which may be rods or plates and which may include, if desired, intentionally formed spring portions. These radial elements 26 are secured to the stator 16 and to the vertical portion of the beam 20 to allow the stator punchings to expand and contract with normal temperature variations. As shown, the extremity of elements 26 fastened to the stator 16 preferably has means 29 for distributing forces over an appreciable area. As thermal forces expand or contract the stator, the sole plates 18 supporting the stator will allow free movement.

Additionally, a plurality of non-radial members 28, that is, members that are tangential with a circle that is concentric with the stator, are also joined between the stator 16 and wall 12. The tangential members take the normal and short circuit torques produced by the stator. As shown, a tangential member 28 may be affixed to adjacent radial members 26 and need not directly connect to the stator 16 or wall 12. Additional tangential members 33 may be employed as shown (FIG. 2) for extra support, if desired.

The location of the stator core on the spaced sole plates spaces the stator above the concrete foundation and allows a portion of the total cooling air to pass under the stator and cool the lower portion of the machine, as shown by arrows 30, FIG. 1. Additionally, heat exchangers 32 for air cooling are conveniently located on the tangential members 28 of the support structure or may be otherwise supported in the space surrounding the stator 16, for passing a cooling medium such as water, in continuous circulation for cooling air in both paths 30 and 31.

The assembly of the machine, even though of large size, may be carried out relatively simply and still include the features of the present invention. The stator 16 will be composed of a plurality of base ring segments positioned on top of the sole plates 18 that are anchored to the foundation. Vertical spacer ribs will be supplied and mounted to this base ring at the job site. Stator punchings will be stacked for the full vertical height of the core. A ring at the top of the core will be assembled at the top of the punchings and spacer ribs. Clamping pressure will be maintained by the bolts on which the punchings are stacked. Spacer ribs will be aligned with the beams to keep the stator vertical and true but allow for the improvement in accordance with the invention.

I claim as my invention:

1. A dynamoelectric machine comprising: a rotor and a stator located concentrically about a vertical axis; a rigid wall concentrically enclosing at least part of said stator spaced therefrom, said wall being integral with a rigid foundation underlying at least a portion of said stator with means to permit movement of said stator in relation to said foundation; means to secure said stator to said wall and said foundation comprising a plurality of beams each including a first portion extending vertically in spaced relation to said stator and also in spaced relation to said wall, said first portion of said beam having a lower extremity joined to said foundation, each beam also including a second portion extending radially from said first portion and having an outer extremity joined to said wall, means for joining said stator with said first portion of said beam comprising both radial and tangential members that are flexible compared with said foundation and said wall, said means for joining comprising a plurality of vertically spaced radially extending rod-like elements and a plurality of tangentially disposed plate-like members, said beams being rigid as compared with said means for joining; said wall and said foundation comprising concrete and said beam extremities being embedded therein.

2. The subject matter of claim 1 wherein: on a plurality of said plate-like tangential members there are mounted heat exchangers for carrying a cooling medium through the space between said stator and said wall.

* * * * *